June 18, 1940.  W. S. MACDONALD ET AL  2,205,299
MEASURING AND RECORDING INSTRUMENT
Filed July 30, 1937   6 Sheets-Sheet 1

INVENTORS
Waldron Shapleigh Macdonald
Webster W. Frymoyer
BY
Blair, Curtis, Dunne & Hayward
ATTORNEYS

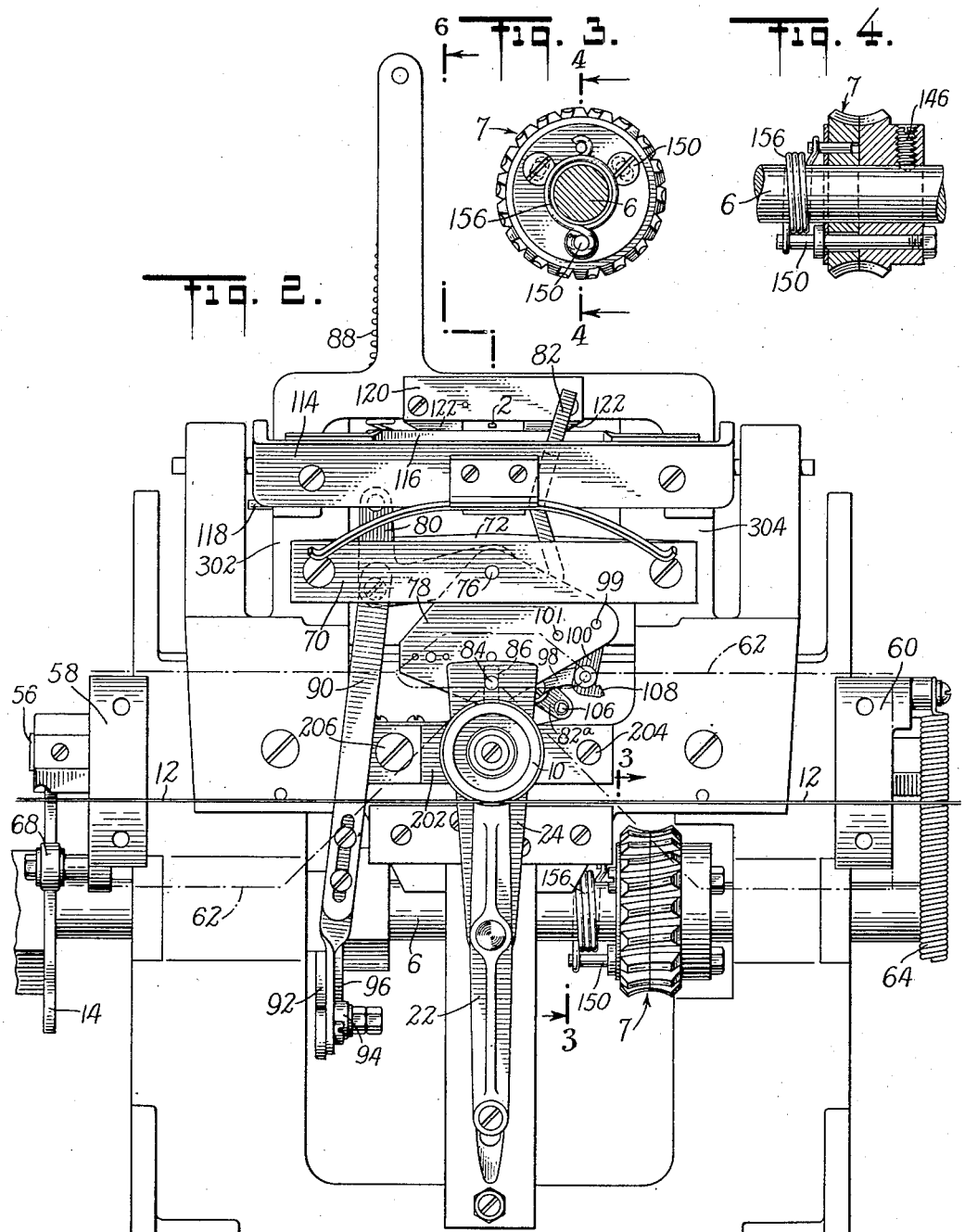

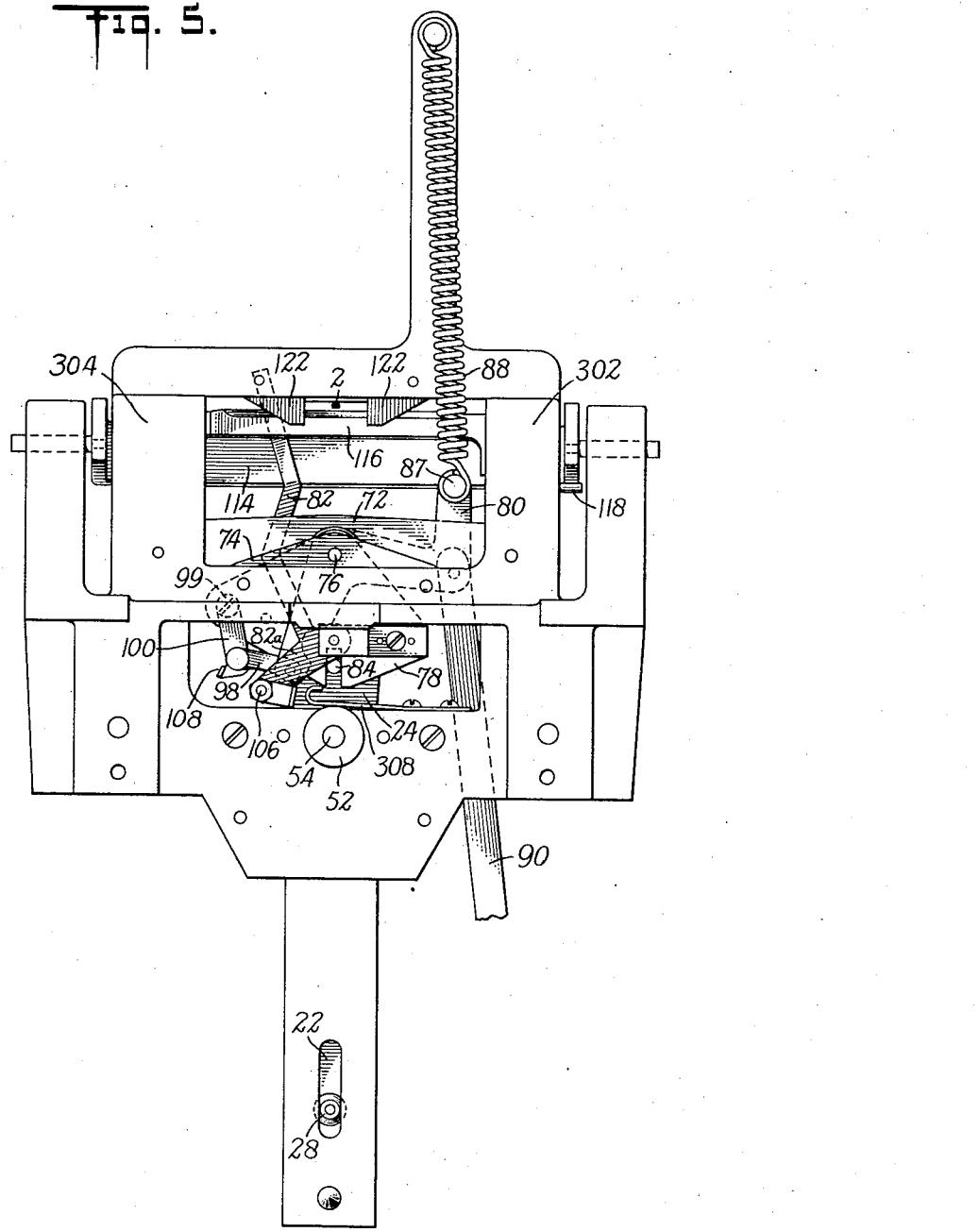

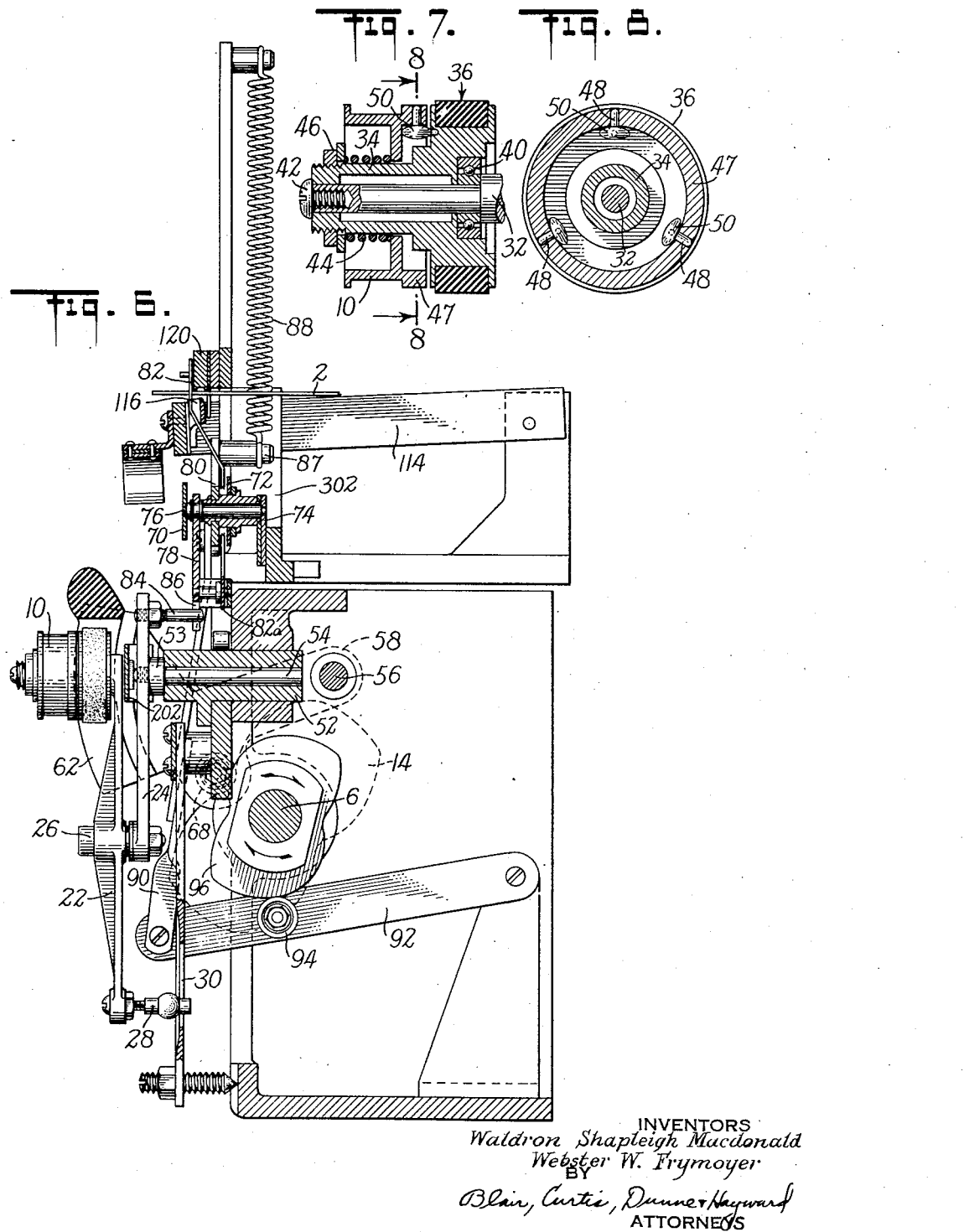

June 18, 1940.  W. S. MACDONALD ET AL  2,205,299
MEASURING AND RECORDING INSTRUMENT
Filed July 30, 1937  6 Sheets—Sheet 5

INVENTORS
Waldron Shapleigh Macdonald
Webster W. Frymoyer
BY
Blair, Curtis, Dunne + Hayward
ATTORNEYS

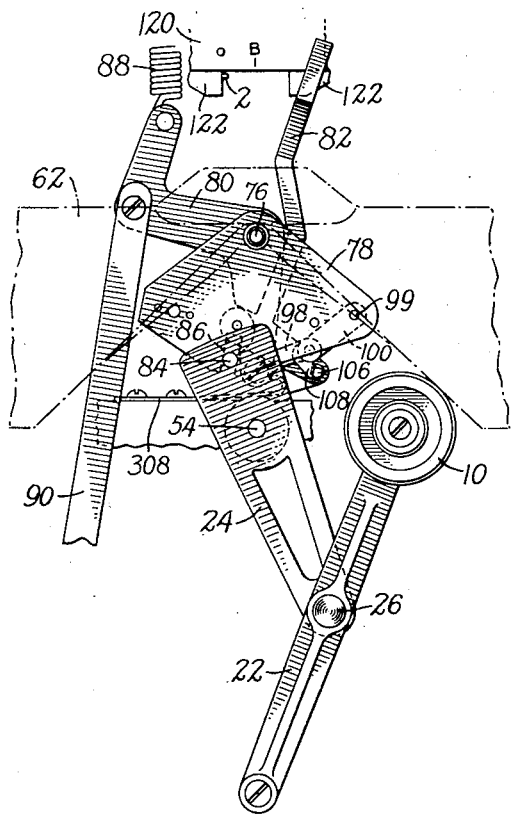
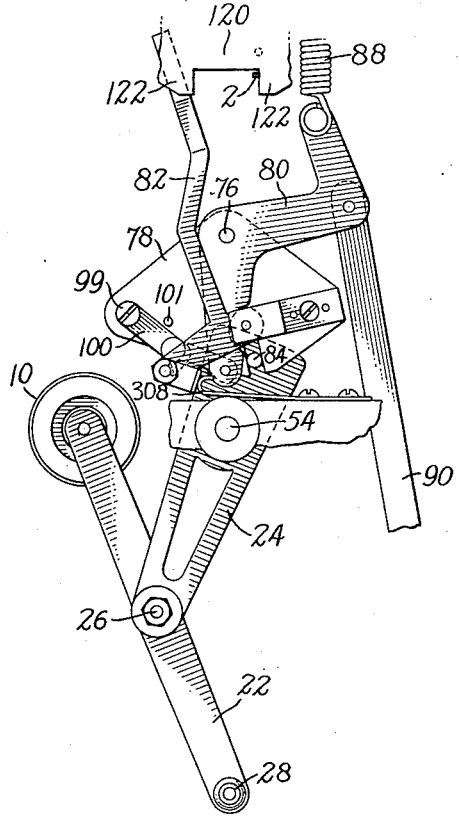
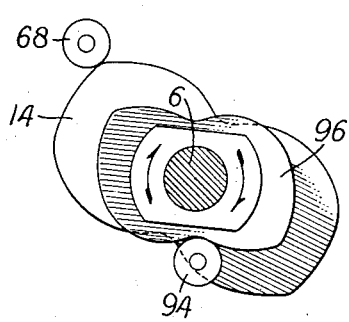
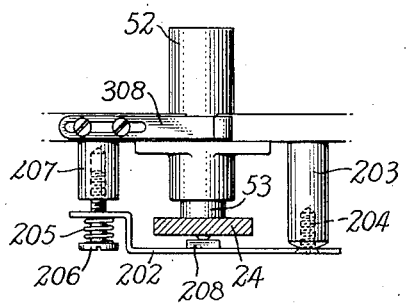

Patented June 18, 1940

2,205,299

UNITED STATES PATENT OFFICE 2,205,299

MEASURING AND RECORDING INSTRUMENT

Waldron Shapleigh MacDonald and Webster W. Frymoyer, Foxboro, Mass., assignors to The Foxboro Company, Foxboro, Mass., a corporation of Massachusetts Application July 30, 1937, Serial No. 156,494

18 Claims. (Cl. 74—1)

This invention relates inter alia to position translating and balancing mechanism and may be used in a potentiometric instrument such as is herein described, to determine position variations of the galvanometer needle and to balance the potentiometer sliding contact or "slider," carried by a "slider carriage" which in the present embodiment also carries indicating and recording means. Other features of the invention relate to improved drive mechanism which may be used in a potentiometric instrument.

One of the objects of the invention is to provide improved apparatus such as above described.

In the accompanying drawings:

Figure 2 is an enlarged view of the position translating mechanism showing also a portion of the balancing mechanism shown at the center of Figure 1 just as it is completing a balancing operation;

Figure 3 is a view of a driving worm gear shown in Figures 1 and 2;

Figure 4 is an axial section of this gear taken on the line 4—4 of Figure 3;

Figure 5 is a back view of the position translating mechanism in the cyclic position shown in Figure 2;

Figure 6 is a sectional view taken on the line 6—6 of Figure 2;

Figure 7 is an axial section of the slider carriage-actuating roller and sheave (part of the balancing mechanism) shown at the center of Figure 1;

Figure 8 is a view on the line 8—8 of Figure 7;

Figure 9:
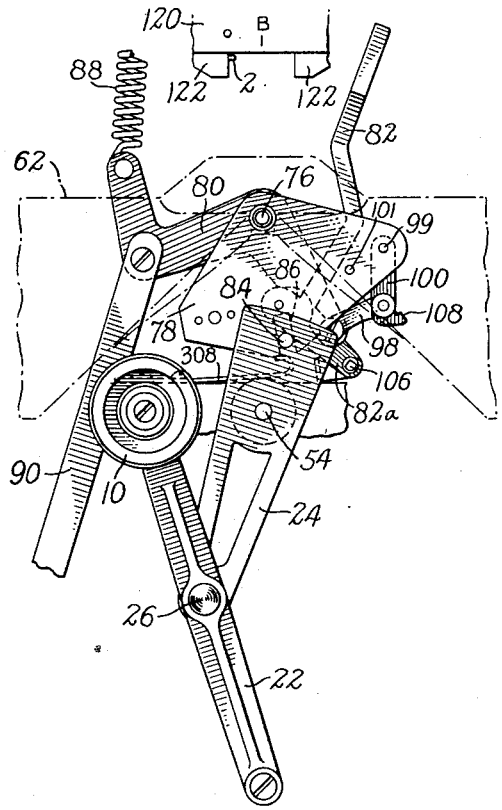
Figure 9 is a detail of the position translating mechanism shown in Figure 2 but shows the position translating mechanism at the end of the position translating movement, and ready for the balancing operation.
Figure 10:
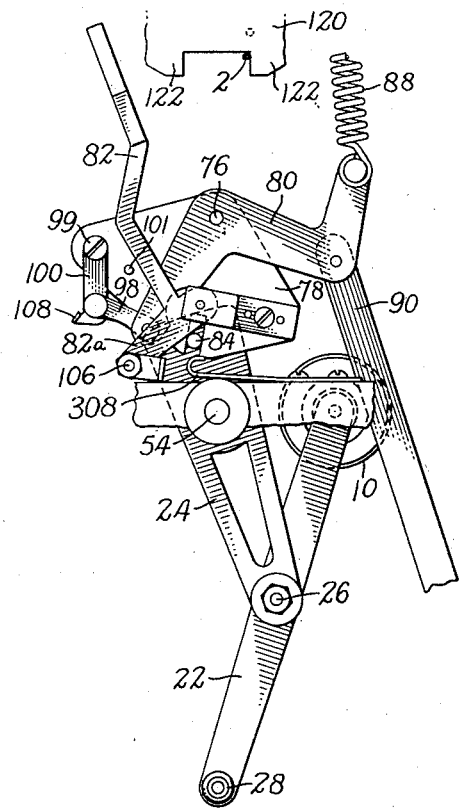
Figure 10 is a back view of Figure 9.
Figure 11A:
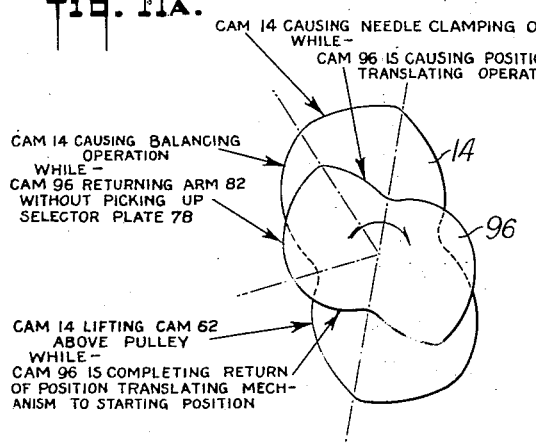
Figure 11:
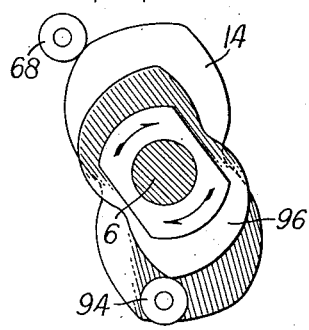

Figure 11 corresponds to Figures 9 and 10 and shows cams 14 and 96 for causing the successive operations respectively of the balancing mechanism and of the position translating mechanism. In the position shown cam 14 is just ready to commence a balancing operation of the balancing mechanism and cam 96 is in the process of returning the position translating means to its starting position;

In Figure 11—A, cam 96 has been rotated with respect to cam 14 for purposes of illustration only (since this could not occur in the operation of the mechanism) to show the respective parts of the cam surfaces that operate simultaneously to move the cam followers;

Figure 12 is similar to Figure 9 but shows the position translating mechanism at the start of a position translating operation;

Figure 13 is a back view of Figure 12;

Figure 14 is similar to Figure 11 but shows the cams in the position they occupy when the position translating mechanism is in the position shown in Figures 12 and 13; and, Figure 15 is a detail top plan view of a part of the position translating mechanism.

The instrument illustrated in the drawings is adapted to measure and make a substantially continuous record of a temperature condition. This record is in the form of a succession of dots impressed upon a chart moving vertically down the front of the instrument. The instrument includes a potentiometer or bridge circuit (not shown) connected with a thermocouple or other electrical temperature responsive element (not shown), an adjustable resistance, and a galvanometer. The galvanometer indicates conditions of electrical balance or unbalance of the circuit, and means is provided, operating under the control of the galvanometer, automatically to adjust the value of the resistance to remove conditions of unbalance, i. e., so that the galvanometer shows a balanced condition of the potentiometer circuit. Thus the slider carriage indicates the amount of resistance required in the circuit to balance the influence of the thermocouple and the position of the slider carriage is directly calibrated to indicate the temperature at the thermocouple. Printing mechanism is mounted to move with the slider carriage crosswise of the chart and to record thereon the various temperature values.

In operation position translating mechanism translates the position of the galvanometer needle to balancing mechanism which moves the slider carriage in a direction and distance depending upon the condition of circuit unbalance as indicated by the galvanometer. When the circuit is balanced following a series of these balancing operations, the position of the slider carriage indicates the temperature. The printing mechanism operates to mark the chart thus recording the temperature of the thermocouple.

Mechanism for operating the printing device and for connecting the instrument with successive thermocouples, if the temperature of more than one thermocouple is to be determined, may be of any known construction and will not be described herein.

Figure 1:
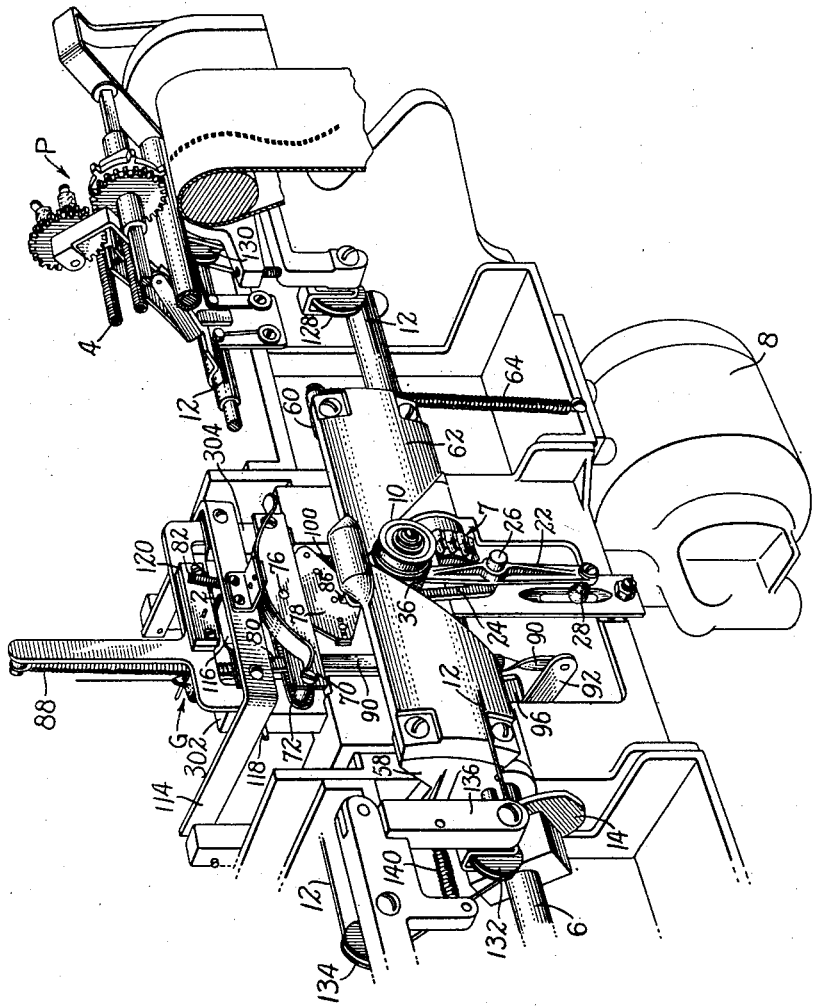
Figure 1 is a front perspective showing the balancing mechanism for operating the slider carriage of a balancing pyrometric recorder. Most of the details of the recorder, such as the housing, framework, switches, rods, etc., are broken away or entirely omitted to show more simply the mechanism embodying the invention.

Referring to the drawings at the central portion of Figure 1, the galvanometer is indicated generally by the letter G and has a forwardly extending needle 2. The slider carriage and printing mechanism, shown to the right and indicated generally by P, may be of the type disclosed in said Moore patent application. The slide wire over which the slider moves is helically wrapped around a horizontal rod indicated by the numeral 4. The remaining structure shown in Figure 1 comprises the position translating mechanism, and the balancing means operating slider carriage P to balance the circuit in accordance with the indication of galvanometer G. The position translating mechanism includes means for periodically clamping the galvanometer needle in the position it then occupies, and means for then moving a feeler along the path of the end portion of the needle until the feeler reaches the clamped needle, and simultaneously setting a selector in accordance with the position of the needle. The balancing means then cooperates with the selector to move slider carriage P in direction and a distance depending upon the position of the needle as determined by the feeler.

The means for moving slider carriage P is such that if the galvanometer needle is clamped in a position to the right of its balanced or neutral position, indicating that the thermocouple temperature exceeds the temperature corresponding to the position of slider carriage P, slider carriage P will be automatically moved to the right a distance depending upon the distance that the needle has moved to the right of its balanced position. If the galvanometer needle is clamped to the left of its balanced position, indicating that the thermocouple temperature is less than that corresponding to the position of slider carriage P, the slider carriage will be automatically moved to the left a distance depending upon the distance that the needle has moved to the left of its balanced position.

The position translating and balancing mechanism is operated by cycling shaft 6 which is driven through worm gear 7 and other gear mechanism by motor 8 and carries the cams which determine the order and timing of the various operations.

Referring to the central portions of Figures 1 and 2, a pulley 10 is rotatably mounted and is movable horizontally in a straight line by the position translating mechanism to a position corresponding to the then clamped position of the needle. Around the pulley 10 is looped a wire belt 12 extending to the left of the pulley 10 and passing around pulleys 132 and 134 to the left side of slider carriage P to which it is attached; and extending to the right of the pulley 10 around pulleys 128 and 130 to the right of slider carriage P to which it is attached.

Pulley 10 is free to rotate during its movement by the position translating mechanism and rolls along belt 12 without moving belt 12 or slide P. Periodically the pulley 10 may be operated to drive belt 12 and slider carriage P by means of a rocker cam 62 having a V-shaped notch, which descends upon the pulley, moving it horizontally to the central or neutral position, and simultaneously positively rotating it to drive the belt and move the slider carriage. In this manner the slider carriage is moved in accordance with the positions of the galvanometer needle indicating unbalanced conditions of the potentiometer circuit.

Referring now to the left central portion of Figure 6 and to Figure 7, pulley 10 is shown mounted upon a stud 32 which is carried by the upper end of floating lever 22. Floating lever 22 is pivotally carried at its center upon the lower end of swinging lever 24 by stud shaft 26, and its lower end has an adjustable bearing pin 28 which rides in a vertical groove 30.

The details of the pulley assembly are shown in Figures 7 and 8. The stud 32 provides suitable bearings for a sheave assembly comprising a rubber-tired roller 36 elongated to form a bearing sleeve 34 to carry the pulley 10. Roller 36 turns upon ball bearings 40. The elongated sleeve 34 has a central opening which also serves as a bearing; and headed screw 42 holds the assembly together. Screwed upon the end of sleeve 34 the washer and nut 46 hold in position the spring 44 which urges pulley 10 toward roller 36, while leaving it free to rotate relative to the roller. The flat side of pulley 10 adjacent roller 36 has a flange 47 wherein three equally spaced radial holes (see also Fig. 8) provide bearings for the shafts 48 of small casters 50, the peripheries of which extend beyond the edge of flange 47 so as to bear upon the flat side of roller 36.

In the path of the casters upon the face of roller 36 are three depressions which the casters may enter and so offer a regulated degree of resistance to turning movement of pulley 10 relative to roller 36. Thus normally pulley 10 submits to the drive of roller 36, but if there is sufficient resistance to such movement to overcome the regulated resistance pulley 10 may remain stationary while roller 36 turns, or vice versa.

Swinging lever 24 (Fig. 6) is pivoted upon shaft 54 held in sleeve 52 in alignment with the center of rotation of pulley 10 when pulley 10 is in its central or neutral position, as shown in Figure 1. As lever 24 swings upon its pivot, pulley 10 will be given a straight line horizontal movement.

Referring to Figures 2, 6 and 15, swinging lever 24 turns against a constant frictional load for reasons that will be discussed hereinafter. This constant load is produced by friction between a shoulder 53 on the shaft 54 and the front of the sleeve 52 in which the shaft rotates. The friction is produced by holding the shoulder against the sleeve with a regulated pressure. Spanning the lever 24 and in line with its shaft 54, a cross piece 202 is rockably supported at its right end (Fig. 15) on a rounded forwardly projecting stud 203. A screw 204 loosely holds this end. The other end of the cross piece 202 has a right angle L-shaped bend and is urged rearwardly by a spring 205 and an adjusting screw 206 threaded into a stud 207. Mounted upon cross piece 202 is a metal bearing block 208 which presses against a rounded projection of the shaft 54, projecting through the front face of the swinging lever 24. By adjusting the tension on the spring 205 the desired friction load between collar 53 and sleeve 52, and hence on the movement of lever 24, is obtained.

Referring again to the central portions of Figures 2 and 6, rockably mounted upon shaft 56 and positioned on opposite sides of pulley 10 are two arms 58 and 60 which carry (see also Figure 1) the rocker cam 62. As this rocker cam is periodically swung down from a raised position one or the other or both of its sloping faces will engage and move rubber-tired roller 36 depending on the position of the roller at the start of the downward movement. As best shown in Figure 2, rocker cam 62 is oscillated by a cam follower 68 carried by the rocker arm 58 and following a cam 14 (see also Fig. 1) fixed upon constantly rotating shaft 6. The cam follower 68 is caused to follow the dwells of cam 14, which produce the downward swing of the rocker cam 62, by a spring 64 attached at its upper end to a stud on the side of arm 60, and at its lower end to the base of the machine. Thus, periodically, the cam 62 descends upon pulley 10, moving it to, but only momentarily holding it at, its central or neutral position, unless the pulley has not already been so positioned by the position translating mechanism while cam 62 was raised. Any movement of the pulley 10 caused by cam 62, however, produces a corresponding movement of slider carriage P.

Coming now to the position translating mechanism for periodically positioning swinging lever 24 and pulley 10 in correspondence with the galvanometer needle position—as best shown in Figures 1 and 6—a diamond shaped plate 78 interlocking with swinging lever 24 is mounted above and to the rear of lever 24 on a shaft 76 (Figure 6). Shaft 76 extends between and is rotatably supported by a rearward support 74 and a cross plate 70 spanning the space between vertical base posts, and spaced forwardly therefrom by suitable studs. The interconnection between swinging lever 24 and the plate 78 is accomplished by a pin 84 extending rearwardly from the top of the swinging lever into an elongated vertical notch 86 in the lower corner of the plate. Thus oscillating movement of the plate produces proportional and reversed oscillating movement of swinging lever 24.

The plate (Figures 10 and 13) is moved by an actuating Z-shaped arm 80 secured to and supported by a sleeve concentric with the shaft 76 (see also Fig. 6) the sleeve being freely rotatably supported at its rearward end by support 74, and in its central portion by a bearing surface in a cross piece 72 spanning the space between the vertical posts 302 and 304 and directly secured thereto. In this manner the sleeve is kept concentric with but spaced from the shaft 76, and the load of the actuating arm on the sleeve is not borne by the shaft.

Extending rearwardly from the upper end of actuating arm 80 (Fig. 6) is a stud 87 to which is attached the lower end of a spring 88, the upper end of which is connected to an extension of the base. Actuating arm 80 is cyclically oscillated by an adjustable link 90 (see also Figures 1 and 2) pivotally connected at its upper end with the actuating arm and at its lower end to the free end of a lever 92. Lever 92 is pivoted at its rearward end and carries a rolling cam follower 94 which rides upon the periphery of a cam 96 on the cycling shaft 6. Spring 88 pulls upwardly upon actuating arm 80 and thus tends to pull adjustable link 90 upwardly, with the result that cam follower 94 is held in contact with cam 96.

During rotation of shaft 6 and cam 96, as cam follower 94 moves from a dwell on cam 96 to a crest, adjustable link 90 is pulled downwardly and actuating arm 80 is swung counterclockwise (Figure 2) against the tension of spring 88. The lower end of actuating arm 80 (Figure 10) is connected through a folding link or toggle mechanism, including links 98 and 100, to the left hand corner of plate 78 by means of a stud screw pivot 99.

By means of this mechanism, counterclockwise (plate positioning) movement (Figure 2) of the actuating arm 80 pushes plate 78, causing it to turn about its axis as long as the toggle is held against folding. But when the toggle is released, continued counterclockwise movement of the actuator arm 80 no longer affects the plate 78, i. e., the two are free to move with respect to one another. However, during the return (clockwise) movement (see Figures 2, 5 and 6) of the actuating arm 80, the toggle is unfolded, and plate 78 is pulled to its starting position (Figures 12 and 13) by means of the toggle now acting as a drag link.

This toggle, or folding link, comprising link 98 (Figure 10) pivoted to the lower end of the actuating arm 80 and link 100 pivoted to the back side of the plate 78, have a pivot connection. The various pivot connections of the toggle mechanism are preferably made so that there is a minimum amount of friction in their operation. During the last part of the clockwise (Figure 2) (return) movement of the actuating arm, by which the plate 78 is returned to its starting position, the link mechanism is pulled to a nearly straight position, but is prevented from moving to dead center by a stop 101 (Figure 13) on the plate 78.

The toggle mechanism is held in its unfolded, or nearly straightened, pushing position during the plate positioning operation by a foot 82a pivoted on the plate and moving with it and carrying a latch stud 106. The latch stud releases the toggle mechanism when a feeler 82 integral with said foot and extending up from the plate 78 moves against the clamped galvanometer needle.

The feeler 82 (Figure 6) reaches up into the path of the needle and is tortuously shaped to avoid contact with various parts of the mechanism. This whole feeler mechanism, including feeler 82 and foot 82a, is so designed that it tends to fall by gravity (Figures 2, 5, 9 and 10) in a clockwise (Figure 2) direction about its pivotal support, so that the foot rests on a surface of the frame work.

The latch stud 106, is squared on two sides to provide a vertical flat face and a top horizontal flat face. As shown in Figures 12 and 13, as the plate is rocked to its extreme clockwise position (Figure 12) it drags the foot 82a with it. Simultaneously, a bent back rider rigidly fixed to the foot 82a opposite the latch stud 106 rides up (Figure 13) a resilient way formed by a curved leaf spring 308 adjustably mounted on the frame work.

This rider and way are preferably so constructed that as the plate 78 rocks to its extreme clockwise position, as determined by the dwells of the cam 96 and the lengthwise adjustment of the connecting link 90, the rider rides up on the way (Figure 13) and pivots the feeler counterclockwise (Figures 2 and 12) to move the latch stud into the path of a toe 108 formed on the link 100 of the toggle.

With these elements thus engaged, as the actuating arm 80 starts its counterclockwise plate positioning movement, it pushes against link 98 and so against link 100 which would turn in a counterclockwise direction about its pivot 99 were it not for the latch stud 106 in the path of the toe 108. Since the toggle is prevented from folding the actuating arm moves the plate 78 with it against the friction load of lever 24 which exists between sleeve 52 and collar 53; and the pressure exerted by the toe on the latch stud of the feeler lever prevents the latch from dropping by gravity away from the toe, as the rider on the foot leaves the resilient way 308. Thus the plate 78 and feeler now move as a unit under the influence of the actuator arm.

This integral movement continues until the feeler moves against the galvanometer needle which has meanwhile been clamped. The needle stops the forward movement of the feeler so that continued movement of the plate 78 causes the feeler to pivot about its point of connection with the plate 78 and so moves the latch stud 106 out of the range of the toe. This releases the toggle mechanism with the simultaneous result that the plate 78 stops because of the adjusted friction load of lever 24 and is left in its selected position. Continued motion of the actuating arm to its extreme position (Figures 9 and 10) merely folds the toggle mechanism.

Since the relationship between the latch stud 106 and the toe and between the feeler and the plate is fixed, the toggle mechanism will be released and the plate will always be left at a position corresponding with the position of the galvanometer needle when the feeler reaches it. Upon releasing the toggle mechanism, the feeler drops back by gravity out of contact with the needle and out of the range of the toe on the lever 100.

In Figures 9 and 10 which show the actuating arm moved to its extreme counterclockwise position (Figure 9) and ready to start its slower clockwise movement, the galvanometer needle was clamped to the left of its balanced position and consequently the plate was left so as to position the pulley to the left of its central position.

In this particular embodiment, the slope of the contacting surface of the toe, the shape of the latch stud 106, and the position of the pivot point of the feeler with respect to the central pivot of the toggle, are so related that, in order for the latch stud to release the toe, the toe must move slightly toward the pivot point of the feeler. By providing for this movement, however slight, the toe does not release the latch stud prematurely; this does not impair the accuracy of the instrument as the toggle mechanism is nearly in its straight line position and the strain upon the various delicate elements is not great. Under some operating conditions, the friction load of lever 24 is adequate to prevent premature release and an arrangement of the parts to cause this movement of the toe need not be provided.

Further, the parts preferably are so related that when the toe and latch stud are in latching position the toggle is as nearly straight as is practical, so that no greater force component is borne by the feeler to move the plate 78 than is necessary to hold the latch stud and toe in contact.

The abrupt edges provided on the latch stud and toe insure the latch always releasing the toe when the feeler and plate 78 reach a certain relative position. Thus irregularities in operation are avoided. It may also be desirable to provide these contacting parts with hardened surfaces to prevent wear.

The cycle of operation of the actuating arm and balancing mechanism is shown in Figure 11—A. As the roller 94, operating the position translating mechanism, rolls down the more gentle slope to the dale of cam 96, the actuating arm pulls the plate 78 to its extreme clockwise position (Figures 12 and 13), simultaneously pushing the pulley to its extreme right hand position and moving the latch stud of the feeler into latching position by dragging the foot of the feeler up the resilient way. As the roller 94 rides out the more abrupt slope of the cam 96 to a crest, the actuating arm makes its relatively rapid counterclockwise, plate positioning, movement causing the toggle mechanism to pick up the latch stud and move the plate and feeler with it as a unit until the feeler reaches the clamped needle and releases the toggle mechanism. The actuating arm is thus moved to its extreme counterclockwise position by a crest of cam 96 and starts its relatively slow clockwise return movement relatively slowly as determined by the gentle slope of cam 96 into a dwell. This leaves the plate free, with respect to the actuating arm, for a sufficient length of time to allow the balancing mechanism to contact and move the pulley to its center position if it has not already been so positioned by the plate. The actuating arm continuing to move clockwise straightens the toggle mechanism and pulls the plate, pulley and feeler to their respective starting positions.

Referring to Figures 2 and 6, the needle clamping mechanism is a simple bail 114 reaching forwardly beneath the end of the needle. The bail normally rests by gravity in the position shown in Figures 1 and 6 on a stop pin 118 in the left forward vertical post. From this position it is periodically raised by the balancing mechanism cam 62. This is accomplished by a resilient bow spring extending from the front face of the bail into the path of the upper edge of the cam 62 when raised to its uppermost position. The back face of the bail carries a cross piece 116 having a narrow top edge raised above the bail. This edge is aligned with a groove in the bottom edge of an anvil 120 secured to a stationary cross piece of the frame and just above the needle. The bail moving up clamps the needle between the reduced edges of the anvil and cross piece long enough for the feeler to reach and be arrested by the needle and release the toggle mechanism to position the plate 78.

Limit stops 122 extending downwardly from either end of the anvil limit the movement of the needle to the desired range.

Referring to Figure 11—A, a comparison of the operation of the cam 14 operating cam 62 with the operation of cam 96 operating the actuating arm 80 is shown. The cam follower 68 as it rides to the dwell of cam 14 lifts cam 62 into its needle clamping position and holds it there during the position translating movement of the feeler. It then descends down the relatively gentle slope into the dwell of cam 14 to lower cam 62 into contact with the rubber-tired roller 36 of the pulley assembly 10 (Figure 6) to carry out the balancing operation. The cam follower 68 now starts its outward upward movement to the dwell of cam 14 again to raise the cam 62 out of the path of the pulley 10 and to clamp the needle. Meanwhile cam 96, driving the actuating arm 80, is simultaneously returning the position translating mechanism to its starting position.

As shown in Figure 1, the tension on the belt 12 is maintained by mounting pulley 132 on a swinging support 136, and by providing a spring 140 which urges the pulley 132 to the left and so keeps the desired tension on the belt.

Referring to Figures 1, 3 and 4, an improved drive is shown. The springs 64 and 88, driving respectively the cam 62 and the actuating arm 80, tend to cause the main drive or cycling shaft to run ahead of the motor while the cam rollers are rolling into the dwells of the cams. This over-drive introduces backlash between the gears, and to overcome it the worm gear 7 driven by the worm is split in half transversely of its axis. Looking at Figure 4, the right-hand section is securely fixed to the shaft by means of a set screw 148. The left-hand section is freely mounted on the shaft, but has only limited movement with respect to the right-hand section. This limited movement is provided by the bolts 150 which extend through the right-hand section and through elongated slots in the left-hand section. A coiled spring 156 secured at one end of the bolts and at the other end to a pin in the left-hand section produces a turning moment of the left-hand section with respect to the right-hand section. This moment keeps one-half of the gear against one face of the worm drive and the other half of the gear against the opposite face.

We claim:

1. In apparatus of the class described, in combination, positionable means, operating means for periodically positioning said positionable means, feeler means movable simultaneously with said positionable means for releasing said positionable means from the operating means when said feeler means reaches a predetermined position.

2. In apparatus of the class described, in combination, a meter element, positionable means, operating means for periodically positioning said positionable means, feeler means movable simultaneously with said positionable means for releasing said positionable means from the influence of said operating means when said feeler means is stopped by contact with said meter element.

3. In apparatus for translating the value of a condition into a mechanical position comprising, positionable means, periodically operating means for positioning said positionable means, sensing means adapted to sense the value of a condition and simultaneously movable with said positionable means, and means controlled by said sensing means for releasing said positionable means from said operating means when said sensing means senses said value.

4. In apparatus for translating the position of a meter element to a mechanical position, in combination, positionable means, operating means for periodically moving said positionable means, feeler mechanism adapted to detect the position of the meter element, and means controlled by said feeler mechanism for releasing said positionable means from said operating means to leave said positionable means in a position corresponding to the position of said meter element.

5. In apparatus for translating the position of a meter element to a mechanical position, in combination, positionable means, operating means for periodically moving said positionable means, feeler mechanism adapted to detect the position of the meter element, and means controlled by said feeler mechanism for releasing said positionable means from said operating means to leave said positionable means in a position corresponding to the position of said meter element, said last named means being operable substantially independently of any force of engagement between said feeler mechanism and meter element.

6. In apparatus of the class described, the combination of, a first member, a second member, a feeler member, releasable means for positively driving said second member by means of said first member, said releasable means being operated by stopping movement of said feeler member to free completely said second member from said first member.

7. In apparatus of the class described, the combination of, a roller positioning assembly including, a driving member, a driven member, a feeler member, and releasable means to connect said driven member to said driving member, said releasable means being controlled during at least a portion of the roller positioning cycle by said feeler member.

8. In apparatus of the class described, the combination of, a roller positioning assembly including a driving member, a driven member, feeler member, friction means, and releasable means to connect said driven member to said driving member, said releasable means being controlled during at least a portion of the roller positioning cycle by said feeler member, and said friction means tending to prevent movement of said driven member.

9. In apparatus of the class described, a first pivoted member and friction means for resisting pivotal movement thereof, a second pivoted member, a feeler member, means periodically moving said second pivoted member from a predetermined point through a predetermined arc, releasable means connecting said first pivoted member, said feeler, and said second pivoted member for positively driving said first pivoted member and feeler from said second pivoted member, said releasable means being controlled by resistance to movement of said feeler member.

10. In indicating apparatus for recording values of a condition, the combination of, adjustable means to assume a position corresponding to the value of the condition being measured and positioning mechanism for positioning said adjustable means, including, vane means mounted to move along a path in either of two directions from a neutral point, a feeler, means to move said feeler from a given point along the path of movement of said vane means, lever means adapted to be moved against friction from a given point along a given path, and latch means associated with said feeler to connect said lever means to the means for moving said feeler along said given path from said given point during the time that said feeler is moving along the path of movement of said vane.

11. In a potentiometer, the combination of, a vane means having a neutral position and being adapted to be deflected from said neutral position a magnitude and a direction dependent upon the actual setting of the potentiometer with respect to the desired setting of the potentiometer, a feeler adapted to be moved from a predetermined position a variable distance until a portion thereof contacts said vane means, positioning means including a positioning member, actuating means to move said feeler and said positioning member, and releasable means associated with said positioning member, said feeler and said actuating means, said releasable means connecting said positioning member to said actuating means at the time said feeler starts moving said variable distance and disconnecting said positioning member from said actuating means when said feeler contacts said vane means and during the time said feeler is being returned to said predetermined position.

12. In apparatus of the class described, in combination, a base member, a moving member and a rockable member independently and rockably mounted upon said base member, means connected to said rockable member and to said moving member including a collapsible link mechanism, and means mounted upon said rockable member adapted to be moved into a position to prevent said collapsible link mechanism from collapsing so that said rockable member is moved by said moving member.

13. In apparatus of the class described, in combination, a base member, a moving member and a rockable member independently and rockably mounted upon said base member, means connected to said rockable member and to said moving member including a collapsible link mechanism, latch means rockably mounted upon said rockable member, and means mounted upon said base member adapted to cause said latch means to become operative when said rockable member is moved to one of its extreme positions, whereby said latch means prevents the collapsing of said collapsible link mechanism so that said rockable member is moved by said moving member.

14. In apparatus of the class described, in combination, a moving member, means biasing said moving member in one direction, means intermittently moving said moving member against the action of said biasing means, a rockable member rockable against friction, a feeler member rockably mounted upon said rockable member, latch mechanism associated with said feeler member, rockable member and moving member, whereby said feeler member and rockable member are moved by said moving member from a predetermined position along a path until said feeler member engages an obstruction.

15. In apparatus for translating the position of a meter element, positionable means including, a first lever pivoted about a first fixed axis and carrying at one end a second lever pivoted at its midportion to the first pivoted lever, a third lever pivoted about a second fixed axis spaced from the first fixed axis, a pin and slot connection between said third and first levers whereby rotation of one causes rotation of the other, a driving lever pivoted about said second fixed axis, a folding link mechanically connecting said driving lever with said third lever, a fourth lever pivoted on said third lever and carrying a latch pin adapted to engage a toe on the middle portion of said folding link, when said folding link is in its unfolded position, to hold the folding link in driving relationship, and the pivot point of said fourth lever being such that movement of said latch pin out of engagement with said toe causes said folding link mechanism to move further toward its unfolded position.

16. In apparatus for translating the position of a meter element, positionable means including, a first lever pivoted about a first fixed axis and carrying at one end a second lever pivoted at its midportion to the first pivoted lever, a third lever working against friction and pivoted about a second fixed axis spaced from the first fixed axis, a pin and slot connection between said third and first levers whereby rotation of one causes rotation of the other, a driving lever pivoted about said second fixed axis, a folding link mechanically connecting said driving lever with said third levers, a fourth lever pivoted on said third lever and carrying a latch pin adapted to engage a toe on the middle portion of said folding link, when said folding link is in its unfolded position, to hold the folding link in driving relationship, and the pivot point of said fourth lever being such that movement of said latch pin out of engagement with said toe causes said folding link mechanism to move further toward its unfolded position, and said fourth lever being so constructed as to drop by gravity and move the latch out of the range of said toe when released therefrom.

17. In apparatus of the class described, a first rockable lever mounted upon a fixed pivot, a lever arm pivoted upon said rockable lever, a roller member mounted upon said lever arm, a feeler member, a second rockable lever controlling the movement of said first rockable lever, moving means which moves from a predetermined position along a predetermined path, and latch means connecting said moving means with said second rockable lever, said latch means being controlled by movement of said feeler member.

18. In apparatus of the class described, first and second rotatable members mounted adjacent each other upon a common axis, spring means biasing said two rotatable members toward each other, a recess in said first rotatable member and cooperating means upon said second rotatable member which includes a roller-like member adapted to cooperate with said recess and cause said two rotatable members to remain in a predetermined angular relationship to each other.

WALDRON SHAPLEIGH MACDONALD.
WEBSTER W. FRYMOYER.